United States Patent Office 2,705,231
Patented Mar. 29, 1955

2,705,231

PROCESS FOR PRODUCING CELLULOSE THIOURETHANES

Arthur L. Allewelt, West Chester, Pa., assignor to American Viscose Corporation, Wilmington, Del., a corporation of Delaware No Drawing. Application December 16, 1948,
Serial No. 65,742

10 Claims. (Cl. 260—216)

This invention relates to an improved method of making thiourethanes of cellulose in which at least one hydrogen atom of the amido group is replaced by an organic radical.

It has been proposed to produce thiourethanes of cellulose by the action of a primary or secondary amine on xantho-fatty acids obtained by reaction of a cellulose xanthate with a monohalogenated fatty acid. However, the thiourethanes obtained from the xantho-fatty acids are dark colored, apparently due to the fact that the products obtained by reacting sodium cellulose xanthate, and say, chloracetic acid, contain free carboxyl groups which persist in the final product, as shown by infra red analysis. The dark-colored thiourethanes obtained by that prior art process cannot be decolorized, so far as now known. Furthermore, such prior art procedures for producing thiourethanes of cellulose are not adapted to the conversion of filaments or yarns of coagulated viscose (cellulose xanthate) to filaments or yarns of the thiourethanes.

It has also been proposed to produce cellulose thiourethanes by the action of an amine on sodium cellulose xanthate. However, it appears that no one has found it possible to produce cellulose thiourethanes by that method.

One object of the present invention is to provide an economical, relatively simple method for the production of thiourethanes of cellulose. Another object is to provide a process whereby filaments or yarns of cellulose xanthate may be converted directly into filaments or yarns of a thiourethane of cellulose. A further object is to provide colorless thiourethanes. Other objects will appear hereinafter.

In accordance with the present invention, sodium cellulose xanthate, either in the form of an aqueous solution, such as a dilute viscose, or in the form of shaped articles, such as filaments, yarns, films, etc. is treated with an aqueous solution of a water-soluble salt of a di- or tri- valent metal which forms a complex with the sodium cellulose xanthate, and the product of that reaction is treated with an aqueous solution of a primary or secondary amine to produce the cellulose thiourethane.

The reaction between the sodium cellulose xanthate and a divalent metal salt results in the production of a compound having the formula

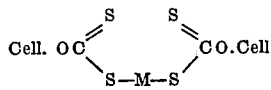

where Cell represents the cellulose molecule and M represents the di-valent metal. A tri-valent metal will produce an analogous salt.

Although the present invention is not predicated upon any theoretical explanation of the process, it appears that when this complex is treated with the primary or secondary amine in the presence of water, the metal cellulose xanthate is split by the water into cellulose xanthic acid and metal hydroxide, and that the cellulosic xanthic acid reacts with the amine to form the cellulose thiourethane, with evolution of hydrogen sulfide which in turn reacts with the metal hydroxide to form the metal sulfide and water. The metal sulfide is present in the final product, together with other metal salts. The sulfide and other metal salts are removed when the cellulose thiourethane, which usually contains some unreacted xanthate groups, is treated with a medium which functions at the same time to convert unreacted xanthate groups to hydroxyl groups.

The parent cellulose xanthate from which the viscose solution or shaped articles, such as filaments, yarns, films, etc. are obtained preferably has the following composition: from 6 to 8% cellulose; from 4 to 8%, and preferably from 4 to 5% of sodium hydroxide, and from about 35 to 100% of carbon disulfide (based on cellulose), from about 60 to 85% carbon disulfide being preferred for the reason that, in order to produce a highly substituted thiourethane, it is desirable to use a viscose containing a large number of xanthate groups (reactive centers). When the cellulose xanthate is in the form of shaped articles, these articles are preferably formed from a freshly prepared viscose, i. e., a viscose having a sodium chloride salt point of at least 12. If the viscose is reacted with the metal in the form of an aqueous solution, the viscose may be aged for from 6 to 24 hours prior to diluting it and adding the dilute viscose to the metal salt solution.

In practicing the invention, the concentration of di- or tri- valent metal salt is preferably from 1 to 10%, most desirably from 3 to 5%, by weight and the solution also contains a dehydrating agent such as sodium sulfate which serves to "salt out" the metal cellulose xanthate complex. Preferably, the sodium sulfate or the like is present in a concentration of from 15 to 20% by weight, the higher concentrations being used when the di- or tri- valent metal salt is present in the preferred concentrations of 3 to 5%.

Various di- and tri- valent metals may be used in practicing the invention, and especially those from groups I, II, IV, and VIII of the periodic table, examples of which are zinc, cadmium, lead, nickel, iron, copper and tin, zinc being preferred for the reason that it yields a white product. These metals form complexes with viscose which are insoluble in water and can be purified by washing with water to remove unreacted sodium cellulose xanthate, without being hydrolyzed.

Preferably, the primary and secondary amine is used in the form of an aqueous solution having a concentration of from 2 to 5%.

The amine may be a primary or secondary alkyl amine. Examples of suitable primary amines are aniline, ethylaniline, isopropylamine, amylamine, benzylamine, cyclohexylamine and octylamine. Examples of the secondary amines are dibenzylamine, dibutylamine, and diethylamine. There may also be used diamines, for example ethylenediamine, phenylenediamine, etc.

Under the stated preferred conditions, cellulose thiourethanes are obtained which contain from about 0.4 to 2.5% nitrogen, the ratio of thiourethane groups to glucose units being from about 1:20 to 1:2.6.

In one method of practicing the invention, viscose having a sodium chloride salt point of at least 12 is diluted with water to produce a 1.5 to 2.5% cellulose solution, depending on the age of the alkali cellulose from which the viscose is produced, and poured into the aqueous solution of the water-soluble salt of the selected di- or tri- valent metal containing sodium sulfate. It is desirable to pour the viscose into the aqueous solution of the metal salt slowly, in order to avoid the formation of globules, and to produce a mass through which the metal salt can be distributed homogeneously, by stirring. Generally, the diluted viscose is added to the metal salt solution at temperatures in the range of 15 to 45° C., room temperature being preferred. The metal xanthate precipitates in the form of fluffy flakes and, with or without washing to remove impurities after their recovery, the flakes are dispersed in the aqueous solution of the primary or secondary amine to produce the cellulose thiourethane. This product is usually obtained in from 24 to 72 hours at room temperature, aqueous solutions of the amine of from 2 to 5% concentration being used. Higher or lower temperatures may be used if desired. The granular precipitate is then purified by a procedure including treatment with a medium which converts residual unreacted xanthate groups to hydroxyl groups. This medium may be any medium that is known to regenerate cellulose from viscose, for example, an aqueous solution of from about 10 to 16% sulfuric acid and about 15% to 20% sodium sulfate. The resulting product can be dissolved in an appropriate solvent and formed into shaped articles by extruding the solution into a coagulating medium.

The solubility of the cellulose thiourethane depends on whether a primary or secondary amine is used in the reaction. The products obtained using a primary amine are soluble in aqueous alkaline solutions, such as solutions of sodium hydroxide generally of from about 3 to 8% concentration, whereas the products obtained using a secondary amine are insoluble in aqueous alkali, but soluble in cuprammonium hydroxide. The aqueous alkaline solutions can be formed into shaped articles by extruding them into saturated salt solutions such as ammonium sulfate or ammonium sulfate-containing solutions which may also contain small amounts of an oxidizing agent such as sodium borate or the like. The low-water absorption and low cross-sectional swelling of these shaped articles, as for example fibers, suggest that during the spinning links or bridges are formed between adjacent thiourethan groups. Cuprammonium solutions can be formed into shaped articles by extruding them into water or an aqueous acid solution.

In another embodiment of the invention, viscose having a salt point (sodium chloride) of at least 12 and preferably containing from 60 to 85% by weight of carbon disulfide (based on cellulose) is extruded through a spinneret or a cellophane die into a coagulating bath which does not regenerate cellulose, for example, 30% ammonium sulfate solution, the sodium cellulose xanthate yarns or films thus produced are treated with the aqueous solution of the metal salt as above, and the resulting metal cellulose xanthate yarns or films are then treated with the aqueous solution of the primary or secondary amine to produce a cellulose thiourethane in which at least one hydrogen of the amido group is substituted by an organic radical. The yarns are then treated with a medium which converts the unreacted xanthate groups to hydroxyl groups, for example, an aqueous solution containing 10% of sulfuric acid, and 20% of sodium sulfate. When the sodium cellulose xanthate starting material is in the form of filaments or yarns, they may be continuous or discontinuous filaments or yarns, that is, the continuous filaments or yarns may be treated as such or they may be cut or broken to staple fibers either prior to or after conversion of the sodium cellulose xanthate to the metal cellulose xanthate, prior to or after conversion of the metal cellulose xanthate to the cellulose thiourethane or prior to or after purification.

By way of illustrating but in no way limiting the invention the following specific examples, in which parts are by weight unless otherwise indicated, are given:

*Example I*

475 parts of viscose (freshly prepared by impregnating 25 parts by weight of cellulose in sheet form with 17.8% caustic soda at 18° C. for two hours, pressing to three times its own weight, shredding and mercerizing for 72 hours at 18° C., xanthating with 85% carbon disulfide by weight (based on cellulose) at 18–25° C. for 5 hours, and then dissolved in sufficient 1% NaOH to make a 5.3% cellulose solution), corresponding to 25 parts of cellulose were diluted with water to make the volume ratio of viscose to water 1:2. This diluted viscose was poured slowly into a solution of 5% zinc sulfate and 20% sodium sulfate at 25° C. The precipitated zinc cellulose xanthate was washed several times with water at room temperature with continuous agitation and filtered between washings, to remove excess zinc and sodium sulfate, any unreacted sodium cellulose xanthate, as well as small amounts of sodium and zinc thiocarbonates formed as by-products. This washing treatment may be performed at temperatures of from 10 to 30° C.

The purified precipitate was slurried with a 3% benzylamine solution in water at room temperatures for 72 hours. The granular precipitate obtained was washed twice with water at about 80° C. filtered between washings, washed with hot isopropyl alcohol or acetone, treated with hot water again and thereafter treated with an aqueous solution of 10% sulfuric acid and 20% sodium sulfate at 50° C. for 5 minutes, washed free of acid with water and then with alcohol, dried and analyzed. The product contained 2.18% nitrogen and 4.90% sulfur corresponding to a N:S ratio of 1:1 and by infrared analysis was shown to have the formula

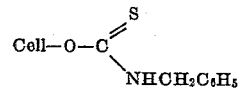

(Cell. representing the cellulose molecule). It is soluble in 3–8% sodium hydroxide solution and can be formed into shaped artciles by extrusion into a saturated ammonium sulfate bath at 5° C. Variations may be practiced. For instance, the amine and purified zinc cellulose xanthate may be slurried from 24 to 72 hours; the granular thiourethane may be washed with water at 75–100° C.; and treated with the solution of 10% sulfuric acid and 20% sodium sulfate for from 5–60 minutes.

*Example II*

Example I was repeated, using a viscose prepared as described but which was allowed to age for from 6 to 24 hours prior to diluting it with water and adding it to the zinc sulfate solution.

*Example III*

475 parts of viscose prepared as described in Example I were diluted, after standing 18 hours, with water to make the volume ratio of viscose to water 1:2. This diluted viscose was poured slowly into a solution of 5% zinc sulfate and 20% sodium sulfate at 25° C. The precipitated zinc cellulose xanthate was washed several times with cold water at room temperature with continuous agitation and filtered between washings, to remove the excess zinc and sodium sulfates, any unreacted sodium cellulose xanthate, as well as small amounts of sodium and zinc thiocarbonates formed as by-products. The viscose may be aged for from 6–24 hours, and the washing may be performed at from 10–30° C.

The purified precipitate was slurried with 2 liters of 3% aniline solution in water at room temperature for 66 hours. The granular precipitate obtained was washed twice with hot water (75–100° C.), filtered between washings, washed with isopropyl alcohol or acetone with agitation, filtered, treated with hot water again, and thereafter treated with an aqueous solution of 10% sulfuric acid, and 20% sodium sulfate at 50° C. for 1 hour, washed free of acid with water and then with alcohol, dried and analyzed. The white product contained 2.25% nitrogen and 5.01% sulfur which gives a ratio of N:S of 1:1 and by infrared analysis was shown to have the formula

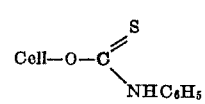

(Cell. representing the cellulose molecule). The above analysis corresponds to a degree of substitution of one phenylthiourethane group per three anhydro glucose units.

The derivative was dissolved in aqueous sodium hydroxide to make a spinning dope of 11.9% cellulose thiourethane and 3.52% sodium hydroxide. It was spun into a saturated ammonium sulfate solution at 10° C., through a spinneret the orifices of which each had a diameter of .003 inch, and given a stretch of 47%. The resulting yarn was washed with water several times and tested. It had a tensile strength of 1.6 grams/denier, dry and .93 gram/denier wet. The extensibilities were 10.7% dry and 18.8% wet. The yarn had a low cross-sectional water swelling of 21.7%. It was dyed to fast level shades with wool type dyes such as Wool Fast Scarlet G, Supra (C. I. No. 252) and Wool Fast Blue Bla. Ex. (C. I. No. 833).

*Example IV*

633 parts of viscose prepared by the procedure described in Example I were diluted, after standing 24 hours at 10° C., with water until the volume ratio of viscose to water was 1:2. This diluted viscose was poured slowly into a solution of 5% zinc sulfate and 20% sodium sulfate at 25° C. The precipitated zinc cellulose xanthate was washed four times with water at room temperature with continuous agitation and filtered between washings, to remove the excess zinc and sodium sulfates and any unreacted sodium cellulose xanthate as well as small amounts of sodium and zinc thiocarbonate formed as by-products. The washing may be performed at from 10 to 30° C.

The purified precipitate was slurried with 2 liters of 3% aniline in water at 35° C. for 18 hours. The granular precipitate obtained was washed twice with water at about 80° C. (Water at 75–100° C. may be used), filtered between washings, washed with isopropyl alcohol or acetone with agitation, filtered, again treated with hot water, and thereafter treated with an aqueous solution of 10% sulfuric acid and 20% sodium sulfate at 50° C. for 5 minutes, washed free of acid with water and then with alcohol, dried and analyzed. The white product contained 1.87% nitrogen which corresponds to a degree of substitution of one phenylthiourethane group per 3.85 anhydro glucose units. The product corresponded to the formula

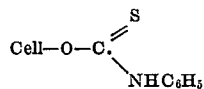

(Cell. representing the cellulose molecule).

The cellulose thiourethane thus obtained was dissolved in aqueous sodium hydroxide to make a spinning dope of 11.1% derivative and 3.55% sodium hydroxide. This was spun into a coagulating bath consisting of 30% $(NH_4)_2SO_4$ at 18° C., using a spinneret having 40 holes, each hole having a diameter of .003 inches. The yarns were given an immersion of 12" in the coagulating bath, and given a stretch of 136%. The resulting white yarns were washed free of salts with water, dried and tested. The yarn had a tensile strength of 1.74 grams/denier, dry, and 0.97 gram/denier, wet; the extensibilities were 5.7% dry and 16.5% wet. The yarn had a cross-sectional water swelling of 32.4% and a linear swelling of 0.86% with a load of .001 gram/denier. It was dyed to level shades with wool type dyes such as Wool Fast Scarlet G. Supra (C. I. No. 252) and Wool Fast Blue Bla. Ex. (C. I. No. 833).

Example V 475 parts of viscose prepared as described in Example I, were diluted (after standing 24 hours at 10° C.,) with water until the volume ratio of viscose to water was 1:2. This diluted viscose was poured slowly into an aqueous solution of 5% zinc sulfate and 20% sodium sulfate at 25° C. The precipitated zinc cellulose xanthate was washed four times with cold water (10–30° C.) with continuous agitation and filtered to remove the excess zinc and sodium sulfates, any unreacted sodium cellulose xanthate as well as small amounts of sodium and zinc thiocarbonate formed as by-products.

The purified precipitate was slurried with 2 liters of 3% ethylamine in water at 25° C. for 20 hours. The reaction mixture was neutralized with 2.5 N. HCl at room temperature and the precipitated product filtered. The residue was washed twice with hot water (75–100° C.), filtered between washings, washed with isopropyl alcohol with agitation, filtered, again treated with hot water, and thereafter treated with an aqueous solution of 10% sulfuric acid and 20% sodium sulfate at 50° C. for 5 minutes, washed free of acid with water and then with alcohol and dried. The white product contained 2.45% nitrogen which is a degree of substitution of one ethyl thiourethane group per three anhydro glucose units.

Example VI 475 parts of viscose prepared as described in Example I were converted to purified zinc cellulose xanthate as described in Example V. The purified precipitate was slurried with 2 liters of 3% amyl amine in water at room temperature for 20 hours. The product was worked up as described in Example V and contained 2.45% nitrogen which represents a degree of substitution of one thiourethane group per 2.77 anhydro glucose units for a compound having the formula

(Cell representing the cellulose molecule).

Example VII 475 parts of viscose prepared as described in Example I were diluted in the aged condition (16 hours) with water to make the volume ratio of viscose to water 1:2. This diluted viscose was poured slowly into a solution of 5% cadmium sulfate and 20% sodium sulfate at 25° C. The precipitated cadmium cellulose xanthate was washed several times with water at room temperature with continuous agitation and filtered between washings, to remove excess cadmium and sodium sulfates, any unreacted sodium cellulose xanthate, as well as small amounts of sodium and cadmium thiocarbonates formed as by-products. The viscose may be aged for from 6–24 hours, and the washing may be performed at from 10–30° C.

The purified precipitate was slurried with 2 liters of 3% aniline solution in water at room temperature for 48 hours. The granular yellow precipitate obtained was washed twice with water at about 80° C. (Water at 75–100° C. may be used.) The precipitate was filtered between washings, washed with hot isopropyl alcohol, treated with hot water again and thereafter treated with 5N hydrochloric acid for 5 minutes at 40° C., washed free of acid with water and then with alcohol, dried and analyzed.

The phenyl thiourethane of cellulose thus obtained contained 1.69% nitrogen and corresponded to the formula

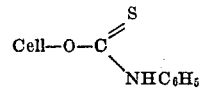

(Cell representing the cellulose molecule.)

Example VIII 475 parts of viscose prepared as described in Example I were diluted in the aged condition (18 hours) with water to make the volume ratio of viscose to water 1:2. This diluted viscose was poured slowly into a solution of 5% copper sulfate and 20% sodium sulfate at 25° C. The precipitated copper cellulose xanthate was washed four times with water at room temperature with continuous agitation and filtered between washings, to remove excess copper and sodium sulfates, any unreacted sodium cellulose xanthate, as well as small amounts of sodium and copper thiocarbonates formed as by-products. The viscose may be aged for 6–24 hours, and the washing may be performed at 10–30° C.

The purified precipitate was slurried with 2 liters of 3% aniline solution in water at room temperature for 48 hours. (The precipitate may be slurried with the aniline solution for from 24 to 72 hours.) The granular dark precipitate obtained was washed with water (twice), filtered between washings, washed with hot isopropyl alcohol, again treated with hot water, and thereafter treated with 5N nitric acid at 40° C. for 5 minutes, washed free of acid with water and then with alcohol. The light colored product corresponded to the formula

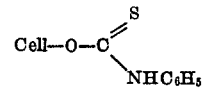

(Cell representing the cellulose molecule) in its chemical and physical properties. It was dissolved in 4% aqueous sodium hydroxide and spun into a coagulating bath of ammonium sulfate at 5° C. This spinning may be performed at temperatures of from 5 to 25° C., the lower temperatures being preferred.

Example IX 475 parts of viscose prepared as described in Example I were converted to purified zinc cellulose xanthate as described in Example V. The purified precipitate was slurried with 2 liters of 3% dibenzyl amine in water at room temperature for 20 hours. The product was worked up as described in Example I and contained 2.09% nitrogen which represents a degree of substitution of one thiourethane group per 2.66 anhydro glucose units for a compound with the formula

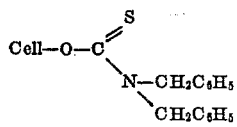

(Cell representing the cellulose molecule).

Example X

A solution of sodium cellulose xanthate containing 35% carbon disulfide by weight (based on cellulose), 7.2% cellulose, and 4% sodium hydroxide and having a salt point of 12.1 was spun into a viscose coagulating bath consisting of an aqueous solution of 30% ammonium sulfate, using a jet having 60 holes, each hole having a diameter of .0025 inch. The yarns were given an immersion of 12" in the coagulating bath, withdrawn from the bath, and given a stretch of 40%. The yarns were then cut into 3-4 inch length staple, immersed in a solution of 5% zinc sulfate and 20% sodium sulfate at 25° C. for 10 minutes, washed with water, immersed in an aqueous solution of 3% aniline at 45° C. for 2 hours, washed with water, and then placed in a bath of 10% sulfuric acid, 20% sodium sulfate at 50° C. for 30 seconds. After withdrawal from the bath, the yarns were washed free of acid with water, dried, and tested. The yarns contained 0.50% nitrogen, had a dry Youngs modulus slope of 20.0 g./den., wet 0.2 g./den. The extensibilities were 30% dry and 40% wet. The yarns were dyed with wool acid type dyes an example of which is Wool Fast Blue Bla. Ex. (C. I. No. 833).

Example XI

A solution of sodium cellulose xanthate containing 35% carbon disulfide by weight (based on cellulose), 7.3 cellulose, and 6.6% sodium hydroxide and having a salt point of 15.8 was spun into a viscose coagulating bath consisting of an aqueous solution of 30% ammonium sulfate, using a jet having 60 holes, each hole having a diameter of .0025 inch. The yarns were given an immersion of 12" in the coagulating bath, withdrawn from the bath, and given a stretch of 40%. The yarns were then cut into 4 inch length staple, immersed in a solution of 5% zinc sulfate at 25° C. for 15 minutes, washed with water, immersed in an aqueous solution of 3% aniline at 45° C. for 90 minutes, washed with water, and then placed in a bath of 10% sulfuric acid, 20% sodium sulfate at 50° C. for 30 seconds. After withdrawal from the bath the yarn was washed free of acid with water and dried. These yarns contained 1.04% nitrogen and could be dyed with wool type dyes an example of which is Wool Fast Blue Bla. Ex. (C. I. No. 833).

Since modifications may be made in the invention as specifically exemplified herein, without departing from its spirit and scope, it is to be understood that the invention is not to be limited except as defined by the appended claims.

I claim:

1. A method for the production of cellulose thiourethanes in which at least one hydrogen atom of the amido group is replaced by an organic radical comprising the step of reacting upon a cellulose xanthate of a metal selected from the group consisting of di- and tri-valent metals of groups I, II, IV, and VIII of the periodic table, with an amine selected from the group consisting of primary and secondary amines in a mixture consisting of said cellulose derivative, said amine, and water.

2. A method as defined in claim 1, wherein said cellulose derivative is in the form of a shaped article and the temperature of reaction is between 15° and 45° C.

3. A method for the production of cellulose thiourethanes which comprises treating an aqueous solution of sodium cellulose xanthate containing from 35 to 100% carbon disulfide based on the weight of the cellulose, with a medium consisting of water containing from 1 to 10% of a water-soluble salt of a metal selected from the group consisting of the di- and tri-valent metals of groups I, II, IV, and VIII of the periodic table and from 15 to 20% sodium sulfate, separating the cellulose xanthate of said metal which precipitates, washing the precipitate with water to remove water-soluble impurities, mixing the purified precipitate with an aqueous solution of an amine selected from the group consisting of primary and secondary amines, separating the amine reaction product and thereafter treating the amine reaction product with an aqueous sulfuric acid medium to convert unreacted xanthate groups to hydroxyl groups.

4. A method as defined in claim 3, wherein the medium consists of water, zinc sulfate, and sodium sulfate.

5. A method as defined in claim 3, wherein the medium consists of water containing cadmium sulfate and sodium sulfate.

6. A method as defined in claim 3, wherein the medium consists of water containing copper sulfate and sodium sulfate.

7. A method as defined in claim 3, wherein the amine is aniline.

8. A method as defined in claim 3, wherein the amine is ethylamine.

9. A method as defined in claim 3, wherein the amine is benzylamine.

10. A method as defined in claim 3, wherein the sodium cellulose xanthate contains from 60 to 80% of carbon disulfide, based on the weight of the cellulose.

References Cited in the file of this patent

UNITED STATES PATENTS

| | | |
|---|---|---|
| 1,684,732 | Harrison | Sept. 18, 1928 |
| 1,906,910 | Lilienfeld | May 2, 1933 |

FOREIGN PATENTS

| | | |
|---|---|---|
| 2,998 | Great Britain | 1907 |